US012799009B2

United States Patent
(12) United States Patent
Castaldo et al.

(10) Patent No.: US 12,799,009 B2
(45) Date of Patent: Nov. 17, 2026

(54) PROCESS FOR TREATING WASTE WATERS HAVING HIGH SALINE CONTENT

(71) Applicant: ENI S.P.A., Rome (IT)

(72) Inventors: Filomena Castaldo, San Donato Milanese (IT); Leonardo Gentile, Gibellina (IT); Alessandro Riva, San Donato Milanese (IT); Alessandro Tamburini, Casteldaccia (IT); Andrea Cipollina, Palermo (IT); Giorgio Domenico Maria Micale, Palermo (IT); Francesco Giacalone, Palermo (IT); Alessandro Cosenza, Palermo (IT)

(73) Assignee: ENI S.P.A., Rome (IT)

(*) Notice: Subject to any disclaimer, the term of this patent is extended or adjusted under 35 U.S.C. 154(b) by 588 days.

(21) Appl. No.: 18/547,284

(22) PCT Filed: Feb. 24, 2022

(86) PCT No.: PCT/IB2022/051631
§ 371 (c)(1),
(2) Date: Aug. 21, 2023

(87) PCT Pub. No.: WO2022/180562
PCT Pub. Date: Sep. 1, 2022

(65) Prior Publication Data

US 2024/0132390 A1 Apr. 25, 2024
US 2024/0228350 A9 Jul. 11, 2024

(30) Foreign Application Priority Data

Feb. 25, 2021 (IT) ........................ 102021000004448

(51) Int. Cl.
*B01D 61/02* (2006.01)
*B01D 61/14* (2006.01)
(Continued)

(52) U.S. Cl.
CPC .............. *C02F 9/00* (2013.01); *B01D 61/025* (2013.01); *B01D 61/145* (2013.01);
(Continued)

(58) Field of Classification Search
CPC .. B01D 61/145; B01D 61/147; B01D 61/422; C02F 1/4693; C02F 3/005
See application file for complete search history.

(56) References Cited

U.S. PATENT DOCUMENTS

2009/0204419 A1 8/2009 Stewart
2016/0304375 A1 10/2016 Terui et al.
2020/0239346 A1 7/2020 Wallace

FOREIGN PATENT DOCUMENTS

CN 104016528 A * 9/2014
CN 105906147 A 8/2016
(Continued)

OTHER PUBLICATIONS

Shi, Shao-yuan et al—CN104016528A machine translation—Sep. 3, 2014 (Year: 2014).*
(Continued)

*Primary Examiner* — Bradley R Spies
(74) *Attorney, Agent, or Firm* — CANTOR COLBURN LLP

(57) ABSTRACT

A process for treating waste waters with TDS≥20 g/l, possibly containing organic substances, includes the following steps:

a. separating the saline wastewater or waste waters from suspended solids and heavy pollutants by physical separation, forming a saline stream free of suspended solids and heavy pollutants;
b. subjecting the saline stream to reverse electro-dialysis, using a reservoir solution to reduce the saline concentration and forming a diluate and a diluted stream (waste water) with TDS not higher than 20 g/l; and (Continued)

c. biologically treating the diluted stream obtained in (b) forming biological sludge, or excess sludge, and clarified water.

26 Claims, 7 Drawing Sheets

(51) Int. Cl.

| | |
|---|---|
| ***B01D 61/42*** | (2006.01) |
| ***B01D 61/44*** | (2006.01) |
| ***B01D 61/58*** | (2006.01) |
| ***C02F 1/44*** | (2023.01) |
| ***C02F 1/469*** | (2023.01) |
| ***C02F 3/12*** | (2023.01) |
| ***C02F 9/00*** | (2023.01) |
| *C02F 1/52* | (2023.01) |
| *C02F 101/10* | (2006.01) |
| *C02F 101/32* | (2006.01) |
| *C02F 103/10* | (2006.01) |

(52) U.S. Cl.

CPC ......... *B01D 61/147* (2013.01); *B01D 61/422* (2013.01); *B01D 61/445* (2013.01); *B01D 61/58* (2013.01); *B01D 2311/04* (2013.01); *B01D 2311/06* (2013.01); *B01D 2311/08* (2013.01); *C02F 1/441* (2013.01); *C02F 1/444* (2013.01); *C02F 1/4695* (2013.01); *C02F 2001/5218* (2013.01); *C02F 3/1263* (2013.01); *C02F 2101/10* (2013.01); *C02F 2101/32* (2013.01); *C02F 2103/10* (2013.01); *C02F 2301/08* (2013.01)

(56) References Cited

FOREIGN PATENT DOCUMENTS

| | | | | | |
|---|---|---|---|---|---|
| CN | 109354340 A | | 2/2019 | | |
| CN | 110316863 A | | 10/2019 | | |
| CN | 110451707 A | | 11/2019 | | |
| CN | 110606612 A | | 12/2019 | | |
| CN | 110627322 A | | 12/2019 | | |
| CN | 109011668 B | * | 8/2020 | ............... | B01D 1/26 |
| KR | 102143397 B1 | * | 8/2020 | ........ | B01F 23/23121 |

OTHER PUBLICATIONS

Zhang, Jian-fei et al 0 CN109011668B machine translation—Aug. 25, 2020 (Year: 2020).*

Shing Yong—KR 102143397 B1 machine translation—Aug. 11, 2020 (Year: 2020).*

International Search Report for International Application No. PCT/IB2022/051631, dated Mar. 31, 2022, 4 pages.

Mei et al., "Recent developments and future perspectives of reverse electrodialysis technology: A review", Desalination 425 (2018) 156-174.

Wang et al., "Hybrid RED/ED system: Simultaneous osmotic energy recovery and desalination of high-salinity wastewaster", Desalination 405 (2017) 59-67.

Written Opinion for International Application No. PCT/IB2022/051631, dated Mar. 31, 2022, 7 pages.

* cited by examiner

PROCESS FOR TREATING WASTE WATERS HAVING HIGH SALINE CONTENT

CROSS-REFERENCE TO RELATED APPLICATIONS

This application is a 35 U.S.C. § 371 National Stage patent application of PCT/IB2022/051631, filed on 24 Feb. 2022, which claims the benefit of Italian patent application 102021000004448, filed on 25 Feb. 2021, the disclosures of which are incorporated herein by reference in their entirety.

TECHNICAL FIELD

The present disclosure relates to a process for treating waste waters with a high saline concentration (also called produced water or formation water), possibly containing organic substances. The present process not only reduces the salinity of produced water below the maximum levels permitted by local and national laws, but also reduces the content of organic species possibly present, and possibly to valorise the produced water through the generation of electricity, through the extraction of components with high added value and through the production of acidic and basic solutions.

In the present patent application, salinity means the total amount in grams or milligrams of dissolved ionic salts (TDS, Total Dissolved Solid) in one litre of solution at 20° C.

In the present patent application, waste water with a high saline concentration (produced water) is defined as a liquid waste water, originating from anthropogenic activities, containing contaminants and saline concentrations higher than or equal to 20 g/l, such that it cannot be directly reused or discharged into a receiving water body, nor directly treated by conventional biological processes.

In the present patent application, heavy pollutants are defined as organic substances, e.g. oily substances, and inorganic substances contained in high salinity waste waters which are greater than or equal to 0.010 μm (molecular weights greater than or equal to 1000 Daltons), where the dimension refers to the mesh dimensions of a filtering device, for example the pores in filtering membranes.

In the present patent application, all the operating conditions reported in the text must be understood as preferred conditions even if not expressly declared. For the purposes of the present discussion the term "to comprise" or "to include" also comprises the term "to consist in" or "essentially consisting of".

For the purposes of the present discussion the definitions of the ranges always comprise the extreme values unless otherwise specified.

BACKGROUND

The problem of high salinity waste water, especially if containing organic substances, has become particularly acute in recent years, especially with regard to industrial waste waters where very often the total concentration of dissolved salts can exceed that of seawater.

Several processes for the treatment of high salinity waste waters containing different types of pollutants are known in the state of the art. The state-of-the-art treatments can be divided into physical treatments, chemical treatments and biological treatments. Among these, the biological treatments are the most economical and have good efficiencies, although their operation is strictly limited to low salinity waste water. The traditional method of dilution by adding low salinity water to the saline stream involves high water consumption, resulting in high plant and operating costs, and in some circumstances is not permitted under current regulations. Furthermore, desalination processes such as electrodialysis, when the waste water has high salinity, become economically unsustainable. Other methods used do not involve desalination steps and use halophilic bacterial species for the biological treatment of the pollutants. However, said bacterial species are difficult to cultivate and acclimatise at high salinities and do not allow high removal efficiencies of the pollutant species.

CN 110316863A describes a process for treating produced water from oil extraction, allowing subsequent reuse of this waste water. The process comprises a sedimentation step, a pH correction step, two filtration steps and the passage through a bed of resins.

CN 109354340A describes a process for treating waste waters with high salinity comprising the following steps: removal of suspended solids, pH correction, biological treatment for the removal of organic pollutants, removal of solids and bacteria, salt recovery by reverse osmosis.

CN 110627322A describes a process which includes in the cycle a biological treatment followed by a traditional membrane desalination process (e.g., a combination of ultrafiltration and nanofiltration or reverse osmosis). The diluted water produced by the latter process is used for the direct dilution of the saline wastewater prior to a conventional biological process.

CN 110606612A describes a method of treating high-salinity waste waters from the coke smut industries, which enables the recovery of dissolved salts. The process comprises steps of removal of fluoride ions from the waste water, removal of the silicon present, removal of calcium and magnesium ions through coagulation, flocculation and sedimentation steps. At this point the higher hardness solution is subjected to a pH adjustment and filtered in a set of filters, and then sent to an ultrafiltration unit and resins for further softening. On leaving the resin treatment, the waste water is sent to a decarburization tower and a nanofiltration membrane module for salt removal, then into a reverse osmosis module. The concentrated solution from nanofiltration is sent to a catalytic oxidation step with ozone and into a resin system for TOC removal. At the outlet of the resin system, the waste water is evaporated and crystallized, then sent to a centrifugal separator for the separation of the solids NaCl and $Na_2SO_4$.

CN 110451707A describes a method of treatment and recovery of dissolved minerals for mine waste water, where a pre-treatment is carried out comprising processes of flocculation, sand filtration, activated carbon filtration, softening to remove impurities from the solution and lowering the hardness level. The membrane concentration process consists of reverse osmosis and electro-dialysis. The concentrated solution is conveyed to an evaporation and crystallization system, after which the remaining solids can be used as construction material and the distilled water can be reused.

US 2016/304375A1 describes the reuse of produced water from oil extraction, and proposes a flocculation treatment and desalination by membrane distillation. The membrane distillation is promoted by heat exchangers which provide heat by bringing the stream up to about 80° C.

CN 105906147A describes the treatment of waste waters by physical removal of suspended solids and oily residues, chemical treatment, dilution with the addition of low salinity water and finally biological treatment by plants grown in soil irrigated with the aforesaid treated waste waters.

US 2009/204419A1 describes the use of an API separator, subsequent aeration of the waste water, filtration in an activated carbon bed, filtration on ceramic filters for the production of water for agricultural use.

SUMMARY

The Applicant has designed a sustainable and cost-effective process for treating waste waters with high salinity, possibly contaminated with organic compounds, which may enable the saline wastewater to be used for power generation, the recovery of various value-added salts, and the production of acidic and basic solutions which can be used industrially, for example for washing equipment. This new process uses Reverse Electro-dialysis (RED) or Assisted-Reverse electro-dialysis (A-RED) technology as a pre-treatment to lower the salt content in a high salinity waste water before subjecting it to biological treatment.

A process for treating waste waters, or saline wastewater, with a TDS≥20 g/l, preferably a TDS≥25 g/l, more preferably 50 g/l, possibly containing organic matter, comprising the following steps, the present patent application therefore provides a process including:

a. Separating said saline wastewater or waste waters from suspended solids and heavy pollutants by physical separation, forming a saline stream free of suspended solids and heavy pollutants;
b. subjecting said saline stream to reverse electro-dialysis, using a reservoir solution to reduce the saline concentration and forming a diluate and a diluted stream with TDS not higher than 20 g/l, preferably not higher than 10 g/l, even more preferably not higher than 5 g/l;
c. biologically treating the diluted stream obtained in (b) forming biological sludge, or excess sludge, and clarified water.

Advantageously, said process allows to produce desalinated process water in compliance with current regulations from a stream of waste waters. The reverse electro-dialysis system allows the selective removal of the salinity of the waste water, preferably of the produced water, to values below 25 g/l. Further salinity reduction is carried out downstream of the reverse osmosis unit, with reductions in the permeate of up to 99.7% of the concentration entering the unit. The saline solution resulting from reverse osmosis, the retentate, is then treated in a salt recovery system.

Advantageously, said process can allow to produce electrical energy to partially cover the energy demand of the process.

Advantageously, said process can allow to recover value-added salts from a waste stream, and produce acidic and basic solutions in situ, which can be used for chemical washings of process equipment. The concentration of acid and base produced is equal to or higher than 0.5 M, preferably equal to or higher than 1 M, more preferably equal to or higher than 2 M.

Advantageously, said process allows the treatment of waste water, preferably produced water, with a high saline content with energy consumption less than or equal to 20 kWh/m$^3$, which corresponds to efficiencies greater than or equal to 0.05 m$^3$/kWh.

Advantageously, said process reduces the volumes of solution to be treated, because there is no need to directly mix the waste water with water with a low saline content in order to reduce the saline concentration.

Advantageously, said process exploits biological processes which require low average operating costs.

This results in an overall reduction in the cost of treating produced water, which typically has a salinity (TDS)≥50 g/l, and very often has a salinity of about 70 g/l.

BRIEF DESCRIPTION OF THE DRAWINGS

Further aims and advantages of the present disclosure will appear more clearly from the following description and from the accompanying figures, given purely by way of non-limiting example, which represent preferred embodiments of the present disclosure.

DETAILED DESCRIPTION OF THE DRAWINGS

Figure 1A:
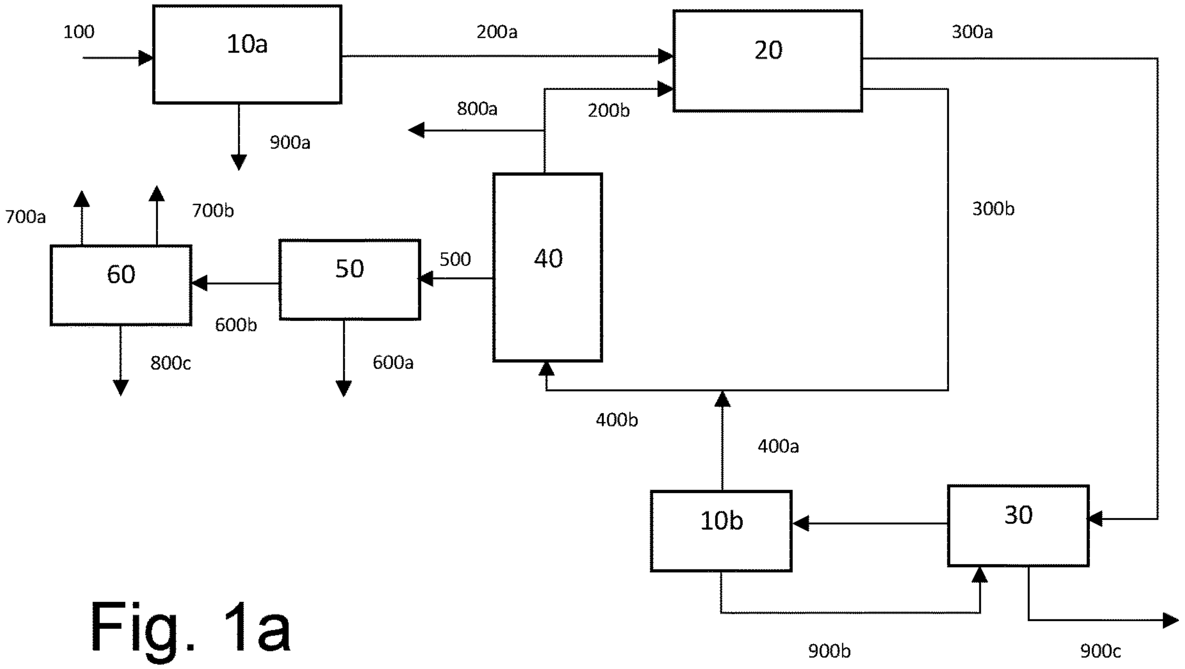
FIGS. 1*a* and 1*b* illustrate preferred embodiments of the described and claimed process.
Figure 1B:
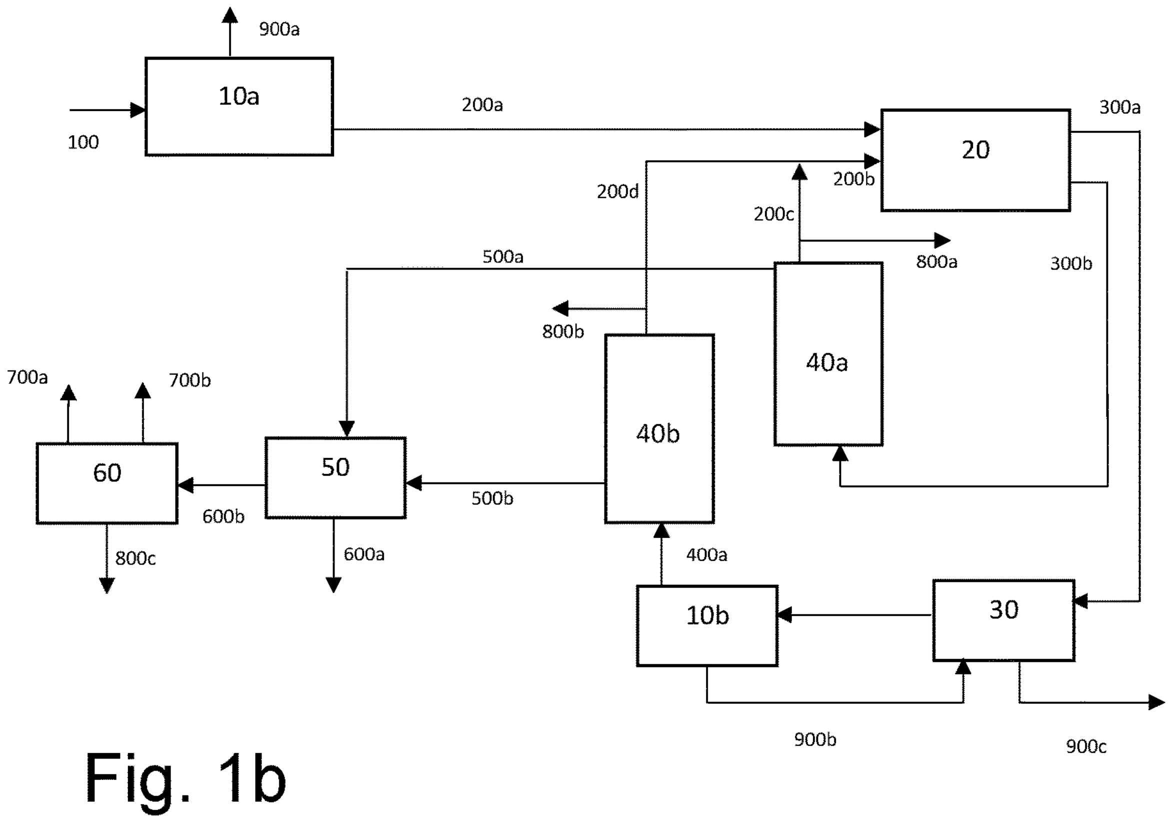
Figure 2:
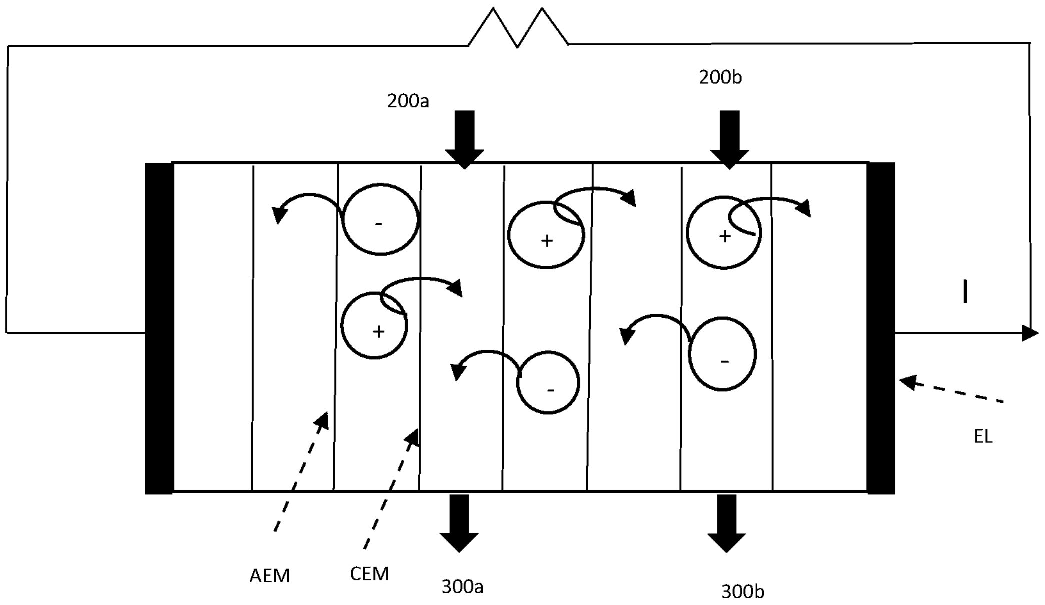
FIG. 2 illustrates a diagram showing the operation of a reverse electro-dialysis unit.
Figure 3:
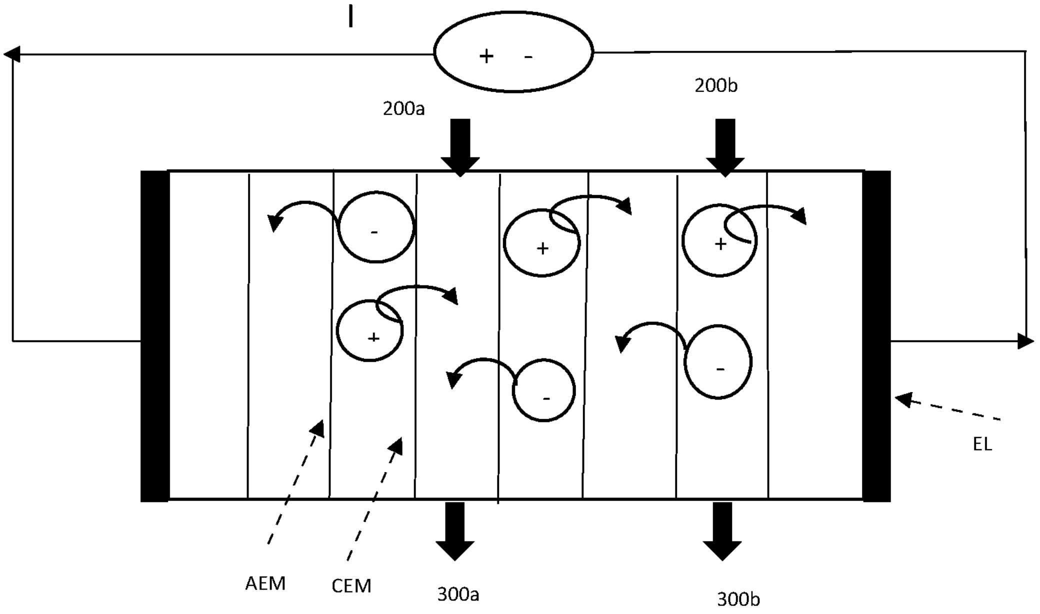
FIG. 3 illustrates a diagram showing the operation of a reverse electro-dialysis unit operating in "assisted" mode.
Figure 4:
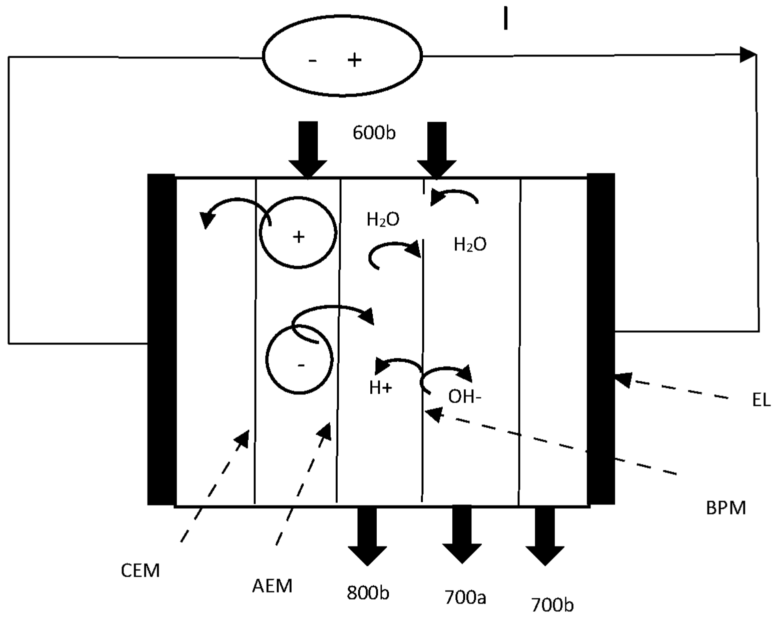
FIG. 4 illustrates a diagram showing the operation of an electro-dialysis unit with bipolar membranes.

In FIGS. 1*a*, 1*b* and 2-4, AEM is an anion exchange membrane, CEM is a cation exchange membrane, BPM is a bipolar membrane, I is the current generated or applied, EL indicates electrodes; 10*a* and 10*b* are ultrafiltration units; 20 is a reverse electro-dialysis unit; 30 is a bioreactor; 40, 40*a* and 40*b* are reverse osmosis units; 50 is a residue valorisation unit, for example a salt recovery unit, and preferably a salt crystallization unit; 60 is an electro-dialysis unit with bipolar membranes; 100 is the polluted saline wastewater (waste waters with TDS≥20 g/l, preferably with TDS≥25 g/l, more preferably with TDS 50 g/l or produced water); 200*a* is the high salinity filtered stream (permeate) entering the reverse electro-dialysis unit; 200*b* is a reservoir solution entering the reverse electro-dialysis unit having a salinity not higher than 20 g/l, preferably not higher than 10 g/l, more preferably not higher than 5 g/l; 200*c* and 200*d* are the reservoir solutions produced as permeate in the reverse osmosis units 40*a* and 40*b* respectively, 300*a* is a diluted stream exiting the reverse electro-dialysis unit having a salinity not higher than 20 g/l, preferably not higher than 10 g/l, more preferably not higher than 5 g/l; 300*b* is the exiting reservoir solution with the characteristic of having been enriched with salts in the reverse electro-dialysis unit (dilute); 400*a* is the filtered stream or permeate exiting the biological treatment; 400*b* is a mixture of the permeate and the salt-enriched reservoir stream which is fed to the reverse osmosis unit; 500 is the salt-rich retentate with a concentration higher than 5 g/l exiting the reverse osmosis unit and sent to the salt recovery unit and the electro-dialysis unit with bipolar membranes; 500*a* and 500*b* are the salt-rich retentates with a concentration higher than 5 g/l exiting the reverse osmosis units (40*a* and 40*b* respectively) and sent to the salt recovery unit and the electro-dialysis unit with bipolar membranes; 600*a* are the salts separated in the salt recovery unit which may be of commercial interest; 600*b* is the stream containing salts which have not been recovered sent to the electro-dialysis unit with bipolar membranes; 700*a* is an acid solution produced in the electro-dialysis unit with bipolar membranes; 700*b* is a basic solution produced in the electro-dialysis unit with bipolar membranes; 800*a* and 800*b* are process waters possibly produced by the process described and claimed; 800*c* is a salt-depleted solution exiting the electro-dialysis unit with bipolar membranes; 900*a* is the retentate exiting the ultrafiltration unit 10*a*; 900*b* is the retentate exiting the ultrafiltration unit 10*b*; 900*c* is the biological excess sludge exiting the bioreactor.

DETAILED DESCRIPTION

The process which is the subject of the present patent application is used for treating waste waters, preferably produced water, with TDS≥20 g/l, preferably TDS≥25 g/l, more preferably TDS≥50 g/l, possibly containing organic matter.

Said waste waters are physically separated so that suspended solids and heavy pollutants are removed from the aqueous matrix, forming a retentate which includes the solids and heavy pollutants, and a filtrate or permeate with a high saline concentration free of solids and heavy pollutants. The function of this step is to protect the membranes used in subsequent process steps, also from the fouling due to heavy pollutants that may inhibit the correct functioning of the membranes, and to remove the heavy pollutants in solution.

This step of physical separation—that also allows to maintain the desalination efficiency of RED for prolonged time, particularly in case of prolonged continuous working—may preferably be a filtration step, more preferably ultrafiltration or microfiltration possibly with ceramic membranes or sand filters. Depending on the specific features of the waste waters to be treated, such a separation step may comprise one or more steps with different cut-offs, possibly supplemented by further physical separation processes in order to remove coarser particles from the specific waste waters to be treated.

The filtrate or stream with a saline concentration TDS 20 g/l, preferably TDS≥25 g/l, more preferably TDS≥50 g/l, is subjected to reverse electro-dialysis to reduce the saline concentration to a value of less than 20 g/l, for example comprised in the range of 15-20 g/l, preferably not higher than 10 g/l, even more preferably not higher than 5 g/l.

For this purpose, a solution with a low saline concentration or "reservoir" solution, the features of which will be described later, is fed into the reverse electro-dialysis step, where it will be enriched with salts to form a diluate.

By means of reverse electro-dialysis, operated in standard mode, it is possible not only to reduce the saline concentration but also to produce electrical energy at the same time. Furthermore, depending on requirements, the electro-dialysis unit can also be operated in "short circuit (sc-RED)" or "assisted (A-RED)" mode. The sc-RED mode reduces the residence time (i.e., the size for the same capacity of the equipment) of the electro-dialysis device without, however, producing any electricity. In A-RED mode, the residence time of the solutions is further reduced, however consuming electricity.

The reverse electro-dialysis step can be conducted in a device or cell at the ends of which two electrodes are applied; this cell comprises anion exchange membranes (AEM) alternating with cation exchange membranes (CEM). In the volumes created between the membranes, a high saline concentration stream, preferably a high saline concentration filtrate, and a low saline concentration solution or 'reservoir' solution flow, respectively.

The reservoir solution during reverse electro-dialysis accumulates and transports the salts of the treated streams, reducing the saline concentration thereof and becomes, as mentioned above, a diluate.

The "reservoir" solution fed to the reverse electro-dialysis step may be any water with low saline concentration (salinity), even though it is preferred that said water is an industrial water, a desalinised water, common waters available in the industrial plants, in order to have an improved circular economy approach and to have a more sustainable process.

The "reservoir" solution fed to the reverse electro-dialysis step may more preferably come from the same desalination process of the present disclosure, after desalination with a reverse osmosis unit. In the case of reverse osmosis, the reservoir solution is the permeate.

The reservoir solution may have a saline concentration (salinity, TDS) of not higher than 20 g/l, preferably not higher than 10 g/l, more preferably not higher than 5 g/l. Moreover, the reservoir solution may also have advantageously a TDS≥0.5 g/l, that is the reservoir solution is not a pure water, potable water, ultrapure water and the like.

The use of a reservoir solution coming from the desalination process of the present disclosure is advantageous in that it is not necessary to use an external fresh solution having low salinity, with the consequent saving of the plant costs and improved sustainability of the process of the present disclosure.

The reverse electro-dialysis unit works by virtue of a potential difference applied (in the case of A-RED) or created by the saline gradient (in the case of RED or sc-RED) between the streams flowing therein. This step may require electricity (in the A-RED case), or it may be energetically self-sufficient, but it may also produce electricity (RED).

The production of electricity by reverse electro-dialysis in the unit is due to the use of ion exchange membranes, cationic and anionic, alternately interposed between a solution with a high saline concentration and a diluted solution (reservoir) capable of generating an orderly flow of ions, converted into electricity at the electrodes of the system. The energy obtained can be used to satisfy part of the energy demand of the described and claimed process.

The energy needed to operate the reverse electro-dialysis unit in assisted mode may also come from a renewable energy source.

The diluted stream obtained after reverse electro-dialysis is treated biologically, preferably by means of a bioreactor or biological reactor, separating the biological sludge or super-sludge from clarified water. The biological treatment has the function of breaking down the organic pollutants present in the diluted stream after electro-dialysis. It is well known that pollutant removal efficiencies in biological treatments are high and, at the same time, the costs are very limited. However, a problem with these treatments is that the biomass is often not able to operate effectively at high salinities (TDS≥20 g/l), so that salt removal is necessary, here performed by the previous reverse electro-dialysis unit. The types of reactors used can be varied, depending on the nature of the waste waters treated. Preferred reactors may be Sequencing Batch Reactor (SBR), Membrane Biological Reactor (MBR), Moving Bed Biofilm Reactor (MBBR), or hybrid configurations therebetween. A bioreactor is a reactor in which the growth of biological organisms capable of breaking down organic pollutants in the waste waters is promoted.

The biological methods involve the use of activated sludge and the most widely used biological treatment at present is the simple activated sludge reactor followed by sedimentation in which the suspended biomass is allowed to settle and then recycled. However, these processes require large volumes of reactors and settling tanks to treat large quantities of waste water. For this reason, alternatives have been proposed, as well as the combination of biological treatments with membrane processes. The membrane bioreactor (MBR) replaces the sedimentation step with an ultrafiltration process for an efficient separation of the sludge from the treated liquid. A further alternative is the Moving Bed Biofilm Reactor (MBBR) in which the biomass can be adhered to carriers, on which a biofilm develops. The carriers are plastic carriers with a high specific area which are kept in motion by air diffusers in aerobic reactors or by mechanical stirrers. This keeps the microorganisms inside the bioreactors operating continuously, ensuring high pollutant removal efficiencies. Furthermore, this process ensures lower pressure losses, elimination of clogging problems and greater resistance of the biospecies to the temperature and nature of the load to be treated. Variants of this type of reactor have been proposed for the process described and claimed, and see the presence of biomass either in the form of biofilm adhered in carriers, or in the form of a suspension, as in the case of Hybrid Moving Bed Biofilm Reactors, and/or the presence of a membrane filtration step in place of sedimentation at the reactor outlet. In the hybrid schemes, with suspended and adhered biomass, there is a big advantage in being able to use the entire reactor volume for biomass growth, and not just the surface area of the carriers. Furthermore, the problems of membrane fouling which occur with simple MBRs are avoided. In Sequencing Batch Reactors (SBR) systems, biological oxidation is operated discontinuously, alternating with the sedimentation step, in which the treated waste water is separated from the sludge.

The described and claimed process may further comprise a second step of physical separation downstream of the biological process, preferably filtration, more preferably ultrafiltration or microfiltration possibly with ceramic membranes or sand filters, the function of which is to further purify the clarified water from the entrained biomass. The choice of this further physical separation depends on the type of biological treatment chosen. Furthermore, a post-treatment with UV lamps after filtration can also be used to further reduce the residual concentration of pollutants and, at the same time, preserve the reverse osmosis system membranes from organic fouling. Preferably, the diluate exiting the reverse electro-dialysis unit can be mixed with clarified water (clarified in the present text) obtained after biological treatment, and the resulting stream can be sent to reverse osmosis, forming a retentate and permeate with TDS not higher than 20 g/l, preferably with TDS not higher than 5 g/l.

Preferably, the diluate exiting the reverse electro-dialysis unit can be mixed with a purified stream obtained after the second step of physical separation downstream of the biological treatment, for example the filtrate after ultrafiltration of the clarified water obtained by biological treatment, and the stream thus obtained can be sent to reverse osmosis, forming a retentate and a permeate with TDS not higher than 20 g/l, preferably with TDS not higher than 5 g/l.

The reverse osmosis step is an optional treatment and its presence depends on the saline concentration of the fed streams, like the mixtures described above. In fact, reverse osmosis is an operation which is only necessary when the saline concentration of said streams or of the clarified water after biological treatment is higher than the values established by local and/or national reference standards.

In a preferred embodiment (FIG. 1*a*), the diluate exiting the reverse electro-dialysis unit, the clarified water obtained after biological treatment or the purified stream obtained by the second physical separation downstream of the biological treatment, can each be treated directly by reverse osmosis, forming in each case a retentate, and a permeate with TDS not higher than 20 g/l, preferably with TDS not higher than 5 g/l.

In another preferred embodiment (FIG. 1*b*), the purified stream obtained by the second physical separation downstream of the biological treatment, is sent directly to a first reverse osmosis module (40*b*), and the dilute stream exiting the reverse electro-dialysis unit is sent directly to a second reverse osmosis module (40*a*), each forming a retentate and a permeate with TDS not higher than 20 g/l, preferably with TDS not higher than 5 g/l.

In a further preferred embodiment, the clarified water stream exiting the biological treatment is sent directly to a first reverse osmosis module (40*b*), and the dilute stream exiting the reverse electro-dialysis unit is sent directly to a second reverse osmosis module (40*a*), each forming a retentate and a permeate with TDS not higher than 20 g/l, preferably with TDS not higher than 5 g/l.

Alternatively, diluted, clarified water or purified stream can be considered process water or disposed of if their content complies with applicable local and/or national regulations.

This choice depends on the salinity values, with particular reference to those obtained after biological treatment, or after physical separation following such treatment.

By means of reverse osmosis the desalination process is completed with the production of a diluted stream, the permeate, with TDS not higher than 20 g/l, preferably not higher than 10 g/l, more preferably not higher than 5 g/l, which may possibly be process water. Part of said diluted stream or process water can be recirculated in a closed loop to the reverse electro-dialysis step as a reservoir solution, making the whole process more sustainable.

The reverse osmosis can preferably be conducted in one or several modules capable of treating streams with different salinities, plus preferably two modules.

In addition to the diluted stream, reverse osmosis produces a salt-rich solution, the retentate, which still contains value-added components. For this reason, the process described and claimed may also comprise a section for the valorisation of the retentate or solute. In fact, the described and claimed process may further comprise a unit for recovering the salts contained in the retentate, preferably a unit for selectively recovering salts, more preferably a value-added salt extraction, possibly by crystallization and/or reactive crystallization, after possible concentration, possibly by ion exchange resins. Ion exchange resins may be used when it is preferable to concentrate a specific salt of commercial or industrial interest.

In general, all salts or value-added elements present in the initial waste water and thus in the reverse osmosis retentate can possibly be recovered with ion exchange resins.

Salts or elements of commercial and industrial interest which can be recovered are preferably chosen from lithium, cadmium, cobalt, iron, copper, manganese, bromine, fluorine, barium, iodine, gold, aluminium, tin, selenium, magnesium, gallium, strontium, caesium, phosphorus, beryllium, scandium, antimony, bismuth, indium, vanadium, tantalum, platinum, tungsten, silver, nickel, zinc, calcium, potassium, boron, germanium, rubidium, titanium. Advantageously, the described and claimed process with two separated process lines and two separated reverse osmosis modules allows to treat the diluate and the clarified water without a direct mixing thereof, making the disclosure feasible even where the relevant local and/or national regulations prohibit direct mixing in the process.

Both the retentate of the diluate and the retentate of the clarified stream or the clarified and purified stream can be valorised by extracting elements of commercial interest and/or producing acidic and basic solutions by electro-dialysis with bipolar membranes. The valorisation of the two streams depends on the salinity thereof and the nature of the salts which the two solutions contain. Preferably, the two retentates from the two reverse osmosis units are treated in a single salt recovery unit and a single electro-dialysis unit with bipolar membranes. Alternatively, the aforesaid retentates are treated in independent units, one for salt recovery and one for electro-dialysis with bipolar membranes for each retentate.

Downstream of the salt recovery section, an electro-dialysis step with bipolar membranes (ED-BM) can also be included, which generates an acidic solution and a basic solution from the waste solution obtained in the salt recovery section, e.g., containing commercially uninteresting salts. In fact, by virtue of an applied voltage, the dissociation of water into H+ and $OH^-$ ions occurs inside the bipolar membrane, which will form acidic and basic solutions with respective counter-ions from the saline solution. These solutions can be used for industrial purposes or for chemical washings of integrated process equipment as a remedy for fouling phenomena. A residual solution low in salts is also produced, which may be recovered or exploited industrially. In particular, the concentration of salts present will depend on the desired concentration of acid and base in the washing solutions. Depending on the saline concentration, the solution exiting the ED-BM unit can be used for industrial purposes or disposed of.

The energy demand of the electro-dialysis unit with bipolar membranes can be met by renewable energy sources, as can that of all the equipment in the integrated process.

The process advantage of the present disclosure arises from the difficulty of treating waste waters of any type, contaminated with organic compounds with the simultaneous presence of a high saline concentration, e.g., sodium chloride.

The process allows to produce water with low salinity and low pollutant content, which can be used as process water in industry. At the same time, it is possible to obtain electrical energy by virtue of the saline gradient established between the brine water to be treated and another low-salinity water stream. Furthermore, a further step of waste water valorisation is envisaged through the extraction of high value-added salts and the subsequent production of acidic and basic solutions from the residual brine.

The heart of the integrated process is the Reverse Electrodialysis Unit (RED). A RED unit consists of a stack of selective, ion-exchange, anionic and cationic membranes positioned alternately, forming channels crossed by two solutions of different salinity. The difference in salinity generates an "ordered" displacement of ions, an ionic current, from the more concentrated solution to the less concentrated one, producing a potential difference across a pair of membranes, usually with open circuit voltage values in the range 0.1-0.25 V per cell pair. The resulting ionic current is then converted into an electric current in special electrode compartments where the redox species reduction and oxidation occur. In order to maximise the migration of ions across the membranes, the reverse electro-dialysis unit can be operated under short-circuit (sc-RED) or assisted reverse electro-dialysis (A-RED) conditions, without generating electricity. In the case of sc-RED, the two electrodes of the system are short-circuited to allow the generation of the maximum current naturally produced by the system, the short-circuit current, at the expense of the naturally generated potential. In the case of A-RED, a potential is applied from the outside, with values of up to 3 V per cell pair, in order to generate an electric field in the same direction as the ionic current between the membranes inside the unit, thus absorbing electrical energy. This facilitates the exchange of ionic species from the concentrated solution to the diluted solution and reduces the residence time of the solutions in the apparatus.

Referring to FIGS. 1_a_ and 2-4, the Applicant describes a preferred embodiment of the described and claimed process. A saline wastewater with TDS≥20 g/l (100) is sent to an ultrafiltration unit (10_a_) for the removal of suspended solids and aggregated pollutants in solid and oily form. The waste water thus filtered free of solids and heavy pollutants (200_a_) is sent to a RED unit (20) to break down the saline concentration and possibly to produce electricity.

The reservoir solution with TDS not higher than 20 g/l (200_b_), possibly from the reverse osmosis system (permeate), is sent to the RED unit (20) to have the ionic species transferred therein, but not the organic pollutants present in the waste water (200_a_), which remain confined therein.

The waste waters (300_a_) exiting the RED unit, with reduced salinity (TDS≤20 g/l), is sent to a bioreactor (30) (MBR, SBR, MBBR or hybrid configurations), where it undergoes biological treatment by bacterial species which may be autochthonous, not halophilic, suitably developed and acclimatised to the operating conditions.

The excess sludge (900_c_) is sent for disposal;

the clarified output from the bioreactor is filtered with a second ultrafiltration unit (10_b_) to remove the biomass entrained by the biological process.

The retentate (900_b_) of the ultrafiltration process is sent to the biological reactor 30.

The treated waste water (400_a_) has a low concentration of pollutants and is combined with the salt-enriched water stream (300_b_) exiting the RED unit (20). The stream (400_b_) formed by the two mixed streams (300_b_) and (400_a_) is sent to the reverse osmosis unit (40) to be desalinated.

The desalinated stream is partly returned to the process and fed to the RED unit (stream 200*b*) and partly used as water for industrial purposes (stream 800*a*).

The retentate (500) from the reverse osmosis step (40) is sent to a crystallization or reactive crystallization unit (50) for the valorisation of the brine by extraction of the added-value salts present, after possible pre-concentration with ion exchange resins.

Products of commercial interest exiting the salt recovery unit (50), identified with the stream (600*a*), are sent for post treatment, if necessary. The stream (600*b*), after the recovery of the salts present, is sent to an electro-dialysis unit with bipolar membranes (60), for the production of acidic (700*a*) and basic (700*b*) solutions from a solution having still a high concentration of salts not of commercial interest.

The acidic (700*a*) and basic (700*b*) solution produced in the unit (60) can be used for industrial purposes or for washing equipment in the integrated process.

The stream (800*c*) exiting the electro-dialysis unit with bipolar membranes (60) has a reduced salinity and can possibly be used for industrial purposes.

In a further embodiment of the disclosure, the reverse electro-dialysis unit (20) is operated either under short-circuit conditions or under assisted reverse electro-dialysis conditions. Under these conditions there is no recovery of electrical energy, but there is an increase in ion exchange between the high and low salinity solution across the membranes. This speeds up the process and can reduce the time the solutions are in the unit or the size of the unit itself.

Referring to FIGS. 1*b* and 2-4, the Applicant describes a further preferred embodiment of the described and claimed process.

The process is identical to that described in FIG. 1*a*, except for reverse osmosis. In fact, according to this preferred embodiment the wastewater 300*a* leaving the RED unit with low salinity is biologically treated (30) to form an excess sludge (900*c*) and a clarified output or clarified water which is sent to a second ultrafiltration unit (10*b*) for the removal of the biomass entrained by the biological process. The retentate (900*b*) of the ultrafiltration process is sent to the biological reactor 30.

The purified stream (400*a*) is sent to a second reverse osmosis module (40*b*) from where a retentate (500*b*) and a permeate (800*b* and 200*d*) or reservoir solution is obtained. The stream 300*b* (reservoir solution enriched with salts after electro-dialysis) is sent to a first reverse osmosis module (40*a*) from where a retentate (500*a*) and a permeate (800*a* and 200*c*) are formed. The two retentates (500*a* and 500*b*) are then treated in the salt recovery unit (50), while part of the two permeates go to form the reservoir solution (200*b*).

The reverse electro-dialysis steps, either in "short circuit (sc-RED)" or "assisted (A-RED)" mode, the reverse osmosis step and the biological treatment step can operate at a temperature between 2° C. and 60° C., preferably between 5° C. and 50° C., more preferably between 10° C. and 40° C.

The reverse electro-dialysis steps, either in "short circuit (sc-RED)" or "assisted (A-RED)" mode, can operate at a pressure higher than or equal to 1 atm, preferably between 1 atm and 5 atm.

The reverse osmosis step can operate at a pressure higher than 1 atm, preferably between 1 atm and 100 atm, depending on the concentration of the saline solution to be treated. The biological treatment step can operate at a pressure higher than or equal to 1 atm, preferably between 1 atm and 5 atm. The operating temperature in the physical separation step, e.g., filtration, ultrafiltration and microfiltration possibly with ceramic membranes or sand filters, can be between 2° C. and 60° C., preferably between 5° C. and 50° C., more preferably between 10° C. and 40° C.

The operating pressure in the physical separation step, e.g., filtration, ultrafiltration and microfiltration possibly with ceramic membranes or sand filters, can be higher than 1 atm, more preferably between 2 atm and 10 atm.

Some examples are given below for a better understanding of the disclosure and of the scope of application despite not constituting in any way a limitation of the scope of the present disclosure.

The examples individually describe a reverse electro-dialysis step, a biological treatment step and a reverse osmosis step according to the teachings of the present patent application. Furthermore, they represent preferred embodiments of the present disclosure.

Example 1 Experimental Testing of the Reverse Electro-Dialysis Unit Only

The following describes the experimental tests carried out to assess the potential of the reverse electro-dialysis process fed with real produced water, both to generate electrical power and as a process for selectively lowering the salinity of the waste waters to values which can subsequently be treated by a biological process.

Figure 5:
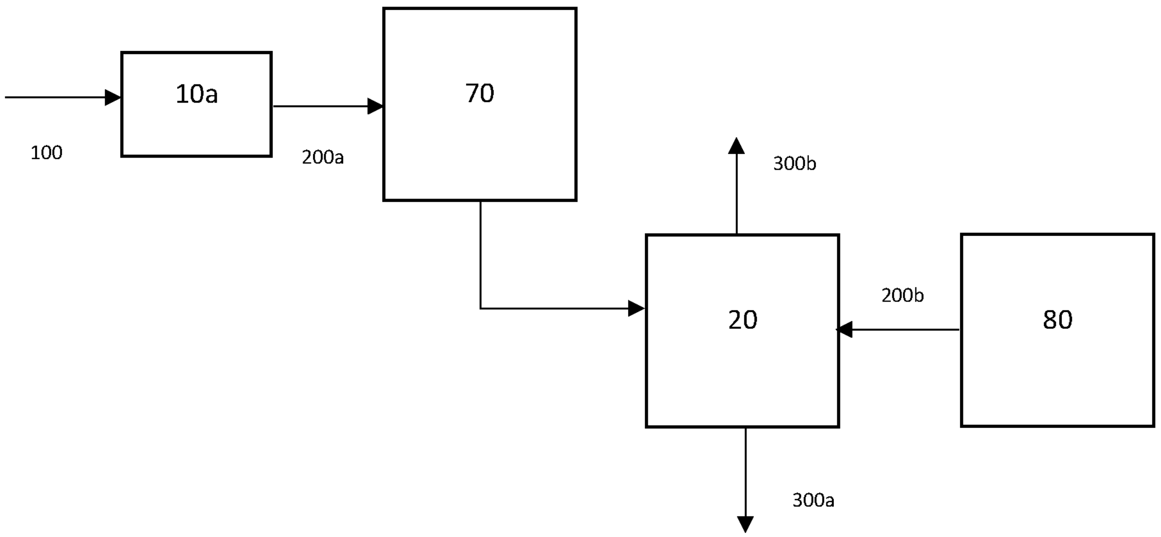
FIG. 5 illustrates the experimental set-up used to conduct the reverse electro-dialysis test described in Example 1 where (70) is the produced water storage reservoir and (80) is the reservoir solution storage reservoir.

A schematic depiction of the experimental set-up used for the standard mode tests is shown in FIG. 5.

The high salinity solution used for the test is real produced water with a salinity of approximately 70 g/l, while the diluted solution (reservoir solution) used is an artificial solution prepared in the laboratory by dissolving a quantity of NaCl (99.8% purity) in distilled water (conductivity of 40 μS/cm) to obtain a final concentration of 0.7 g/l in order to emulate the concentration of common process water available in industrial plants. Table 1 shows the operating conditions and features of the reverse electro-dialysis system used.

The produced water used for testing came from an oil extraction well. Before being used, the produced water underwent a decantation process in order to remove the coarse solids present, then the clarified water was filtered through a set of 5-micron and 1-micron cartridge filters. The resulting solution and the low salinity artificial solution are fed to the experimental reverse electro-dialysis unit with equal flow rates of 81 ml/min.

TABLE 1

RED unit.

| Properties | |
|---|---|
| Dimensions | 10 cm × 10 cm |
| Spacer thickness | 300 μm |
| High salinity solution: Real produced water | TDS = 70 g/l |
| Low salinity solution (reservoir): Artificial NaCl solution | 0.7 g/l |
| Flow rates of fed solutions (speed in the channels) | 81 ml/min (0.5 cm/s) |
| Membranes | Fujifilm type 10 |
| Temperature | 25° C. |

Figure 6A:
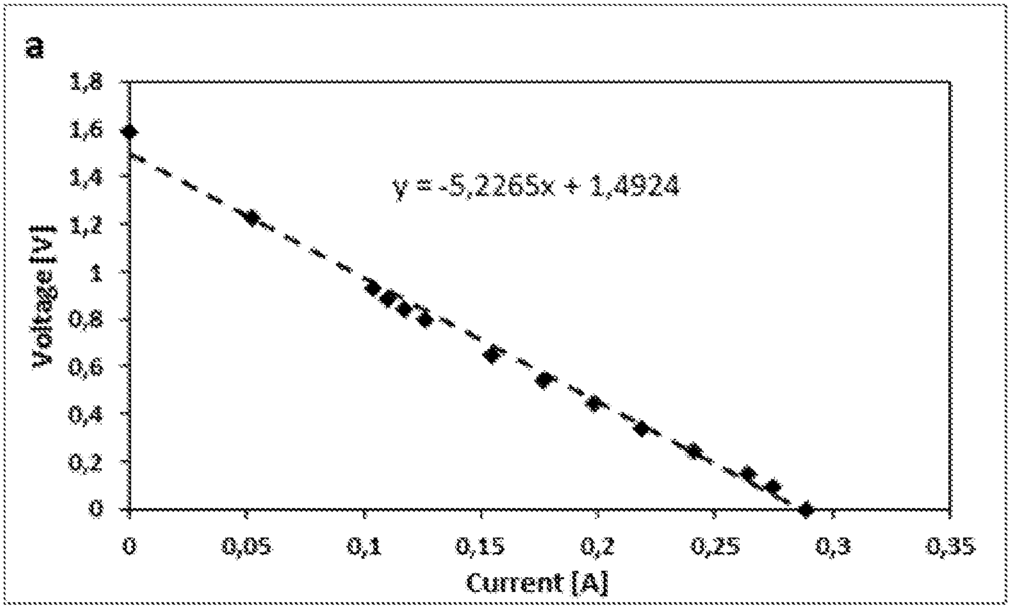
FIG. 6*a*, 6*b* show the trend of the voltage as a function of the stream (a) and power density as a function of the stream (b) in the reverse electro-dialysis conducted in Example 1.
Figure 6B:
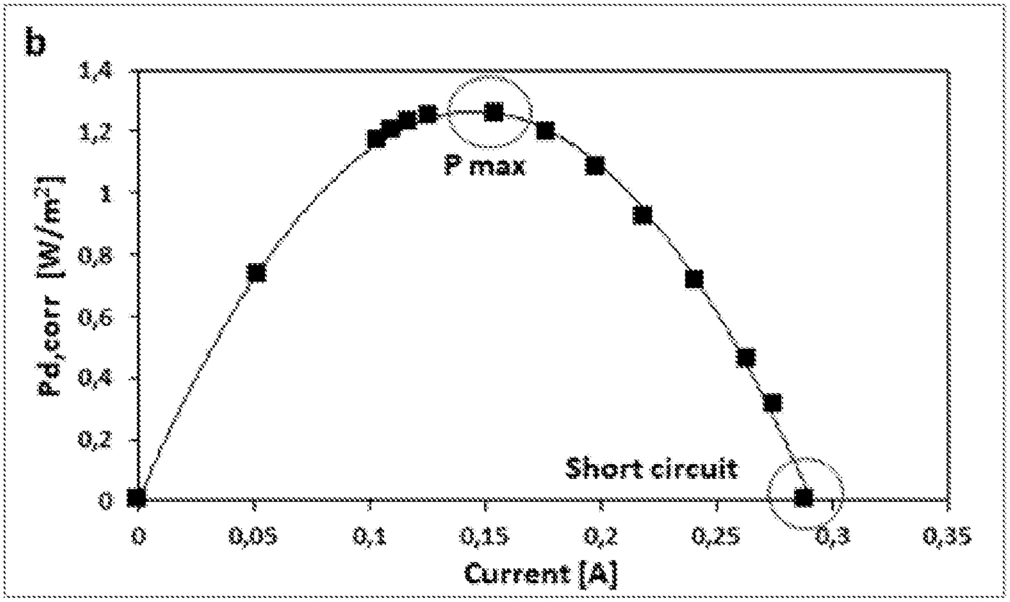

The first tests carried out were aimed at assessing the performance of the system in the power generation step by obtaining the operating curves characteristic of the reverse electro-dialysis process: the power density/current curve and the voltage/current curve. FIGS. 6*a* and 6*b* show the corrected power density/voltage and current/voltage curves, respectively.

The corrected power density represents the power generated by the unit, normalised with respect to the surface area of a repeating unit (cell-pair), eliminating the contribution of the blank resistance, i.e., the resistance of the electrode compartment and the end-membrane. Blank resistance depresses the measured power density in laboratory units with a low number of cell pairs, while it is negligible in industrial units with a high number of cell pairs (e.g., >100).

The characteristic curves shown in FIGS. 6*a* and 6*b* are obtained by feeding the RED unit with the aforementioned solutions and measuring the system's voltage and electric current by varying the resistance value of an external load connected to the RED unit's electrodes. The first significant point is the open-circuit voltage value (OCV), which represents the maximum measurable voltage across the system when the resistance between the electrodes is infinite. In such a condition both the current and the electrical power are zero. An OCV of 0.16 V/cell-pair is observed for the analysed system.

The point of maximum generated power (P max) is obtained at external load resistance values close to those of the unit's internal resistance. For the system under consideration, the maximum power density is approximately 1.26 $W/m^2$. The short-circuit point represents the operating point (sc-RED) with the highest spontaneous current value, the short circuit current, a condition in which there is no power generation, but there is the greatest spontaneous passage of ions through the membranes. The short-circuit current for the unit under consideration is 0.29 A (which is approximately double that corresponding to the maximum power production condition).

Figure 7:
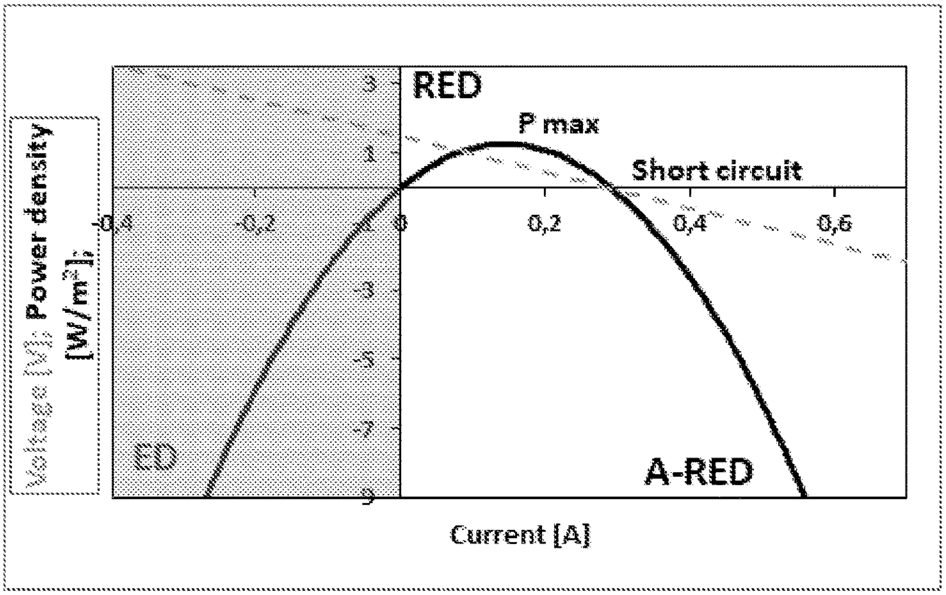
FIG. 7 is a diagram describing the other possible operating modes of the reverse electro-dialysis unit: Electro-dialysis (ED) and Assisted Reverse Electro-dialysis (A-RED).

In addition to the characteristic points of the RED unit (Open Circuit Voltage, P max, Short-circuit), from the slope of the I-V line, it is possible to obtain the internal electrical resistance of the unit, which in this case is 5.2 Ohm. FIG. 7 shows the other possible operating modes of the unit in addition to the one just described: Electro-dialysis (ED), and Assisted Reverse Electro-dialysis (A-RED). To control the passage of ions from the concentrated solution to the diluted solution (and thus the length of the apparatus for the same flow rate), operation can be in RED, sc-RED or A-RED. Depending on the advantage to be achieved, different operating conditions can be chosen. If the advantage is to maximise power generation, the best operating condition is maximum power. However, if the interest is in diluting the waste water for subsequent treatment, it will be more convenient to operate under short-circuit conditions. Depending on the initial concentration of the waste waters to be treated and the concentration to be achieved, it may be convenient to work in intermediate conditions among those mentioned above, combining power production with the dilution effect. To further increase the exchange of ions from the concentrated to the diluted solution and reduce the solution residence time, operation can be in A-RED mode by applying an electric field in the same direction as the ion current.

To reduce the salinity of the produced water under study, the choice of the A-RED mode appears to be more advantageous in long-duration continuous tests. Table 2 shows the operating conditions and features of the RED unit used for testing.

TABLE 2

A-RED unit.

| Properties | |
|---|---|
| Dimensions | 10 cm × 10 cm |
| Spacer thickness | 300 μm |
| High salinity solution: | TDS = 70 g/l |
| Real produced water | |
| Low salinity solution: | 0.7 g/l |
| Artificial NaCl solution | |
| Flow rates of fed solutions | 81 ml/min (0.5 cm/s) |
| (speed in the channels) | |
| Membranes | Fujifilm type 10 |
| Volume of diluted produced water | 25 litres |
| Current density applied | 92 $A/m^2_{membrane}$ |

The produced water is recirculated to allow dilution in several steps even in a laboratory unit. The low-salinity solution or reservoir solution, on the other hand, is maintained at a constant concentration by means of a partial recirculation system and feeding deionised water (Feed and Bleed system).

Figure 8:
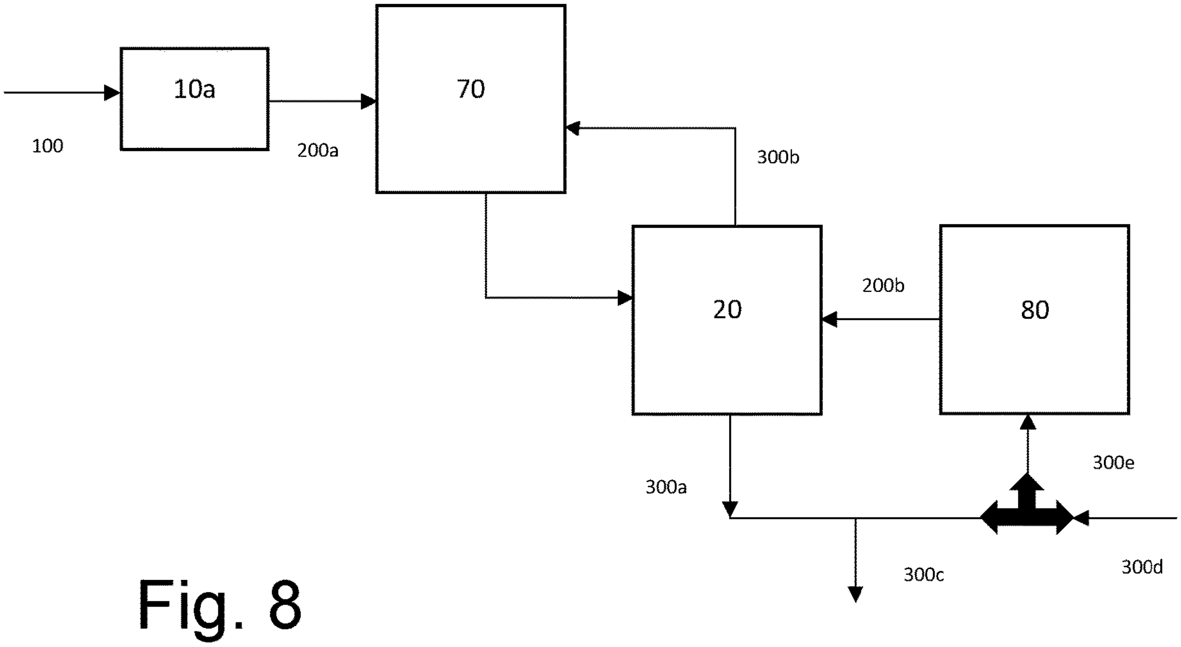
FIG. 8 illustrates the experimental set-up used to conduct the long-term assisted reverse electro-dialysis test described in Example 1 where 300*c* is the purge, 300*d* is deionised water, 300*e* is the recirculation of the reservoir solution.

Tests were carried out by recirculating 25 litres of pre-treated produced water in a set of filters, down to a size of 1 μm, while the artificially diluted solution was kept at a constant concentration of 0.7 g/l. The schematic representation of the system used for the long-term tests is shown in FIG. 8.

Such a recirculation configuration is necessary in order to increase the residence time of the produced water in the experimental unit, which is modest per step given the size of the laboratory-scale experimental unit in question, and at the same time to maintain the high driving force of the process by fixing the concentration of the diluted solution at the inlet.

Figure 9:
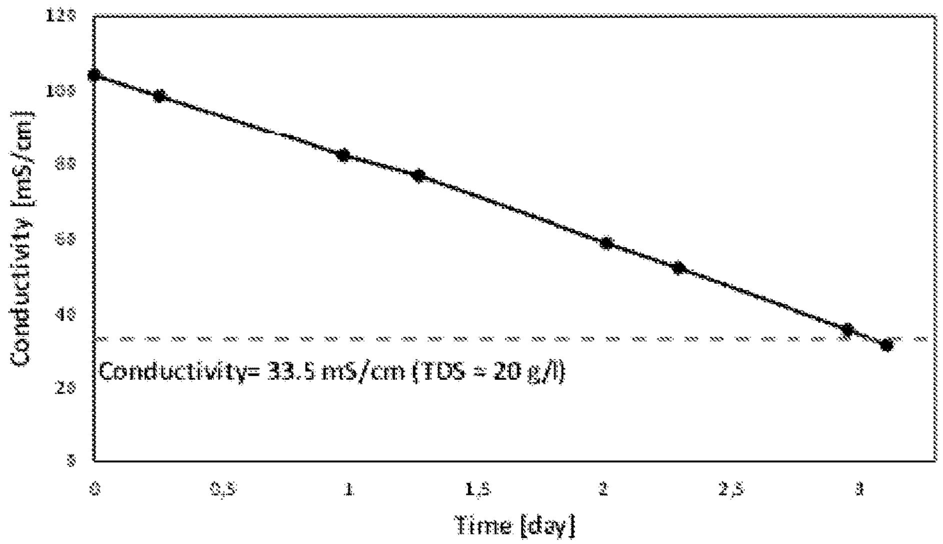
FIG. 9 is the graph showing the trend of the electrical conductivity of the treated produced water as a function of time with the assisted reverse electro-dialysis unit described in Example 1.
Figure 10:
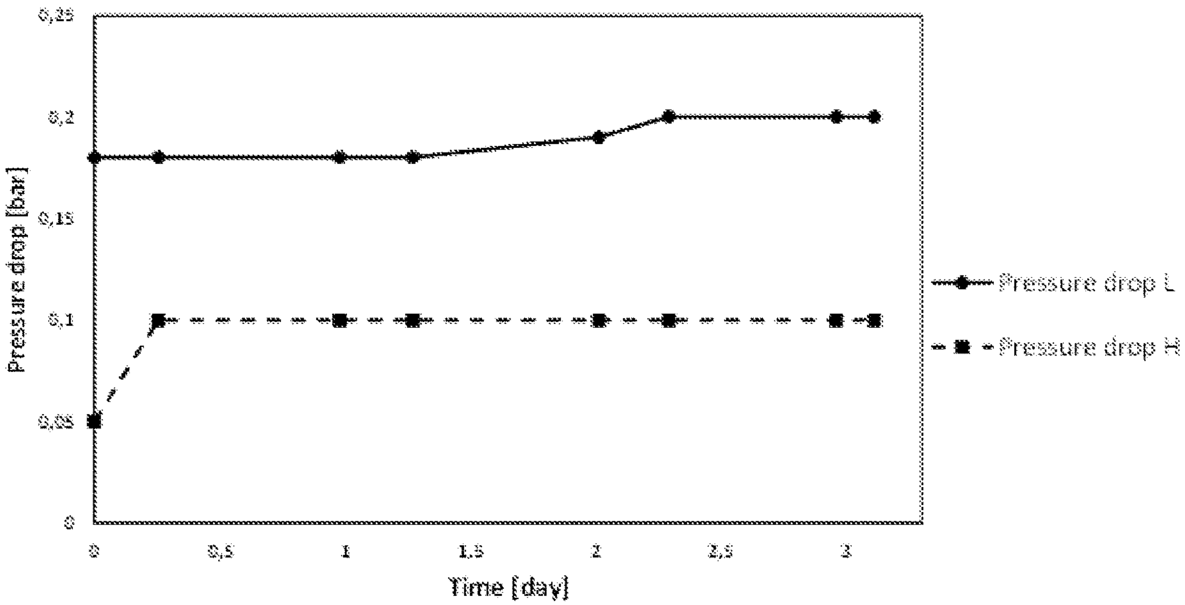
FIG. 10 is the graph showing the trend of the pressure drops of the concentrated and diluted solution fed to the A-RED unit as a function of time as described in Example 1.

FIG. 9 shows the trend in the concentration of treated produced water as a function of time. The dilution of 25 litres of produced water from a concentration of about 70 g/l to the desired concentration of 20 g/l took about 3 days of recycling operations in A-RED mode with a removal efficiency of 70% and an energy consumption of 4.8 kWh/m 3. FIG. 10 shows the system pressure drop as a function of time. A rapid increase in these would indicate a possible physical blockage of the unit's channels. In contrast, these remain approximately constant throughout the test, with values of approximately 0.2 bar and 0.1 bar for the low and high salinity solution, respectively.

Figure 11:
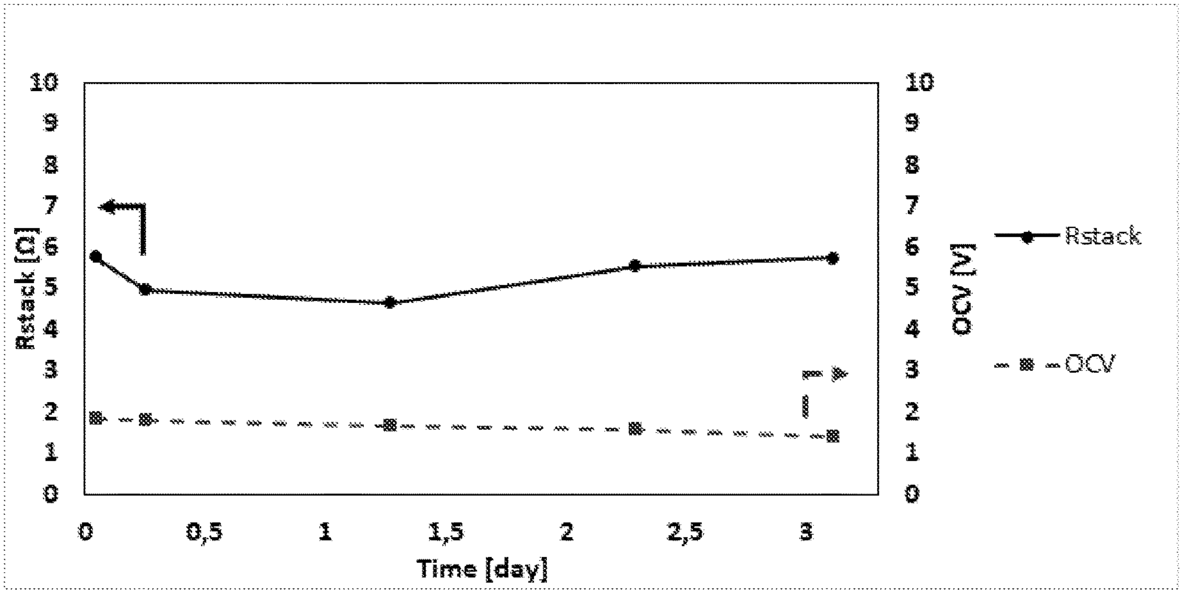
FIG. 11 is the graph showing the trend of the resistance and open circuit voltage of the RED unit as a function of time as described in Example 1.

Tests were carried out periodically (once a day) to monitor the electrical resistance, OCV of the RED unit over time, in order to assess the performance of the membranes and compare it with that of the clean membranes at the start of the test. FIG. 11 shows the development of the unit's resistance and OCV over time. An initial decrease in unit resistance shows a slow adaptation of the membranes to working conditions with the actual produced water. The constant OCV also suggests that there was no damage to the membranes (FIG. 11).

Example 2: Experimental Testing of Biological Treatment Units

The organic pollutants in the produced waters can be treated biologically, but high salinity (>25 g/l) could be a factor which inhibits the metabolic processes of the active biomass. In particular, the biological processes suffer from abrupt changes in salinity which trigger osmotic shocks capable of halting the metabolic activity of the biomass present. Therefore, in order to allow a biological acclimatisation to the salinity conditions and to avoid the aforesaid osmotic shocks, the produced water salinity was lowered by using the RED unit until a value of approximately 20 g/l was reached. In this experimental test, the produced water from the A-RED operation described above was used, but, depending on the concentration of the waste water to be treated, the process can also occur in sc-RED or standard RED mode.

In this case, the native biomass naturally present in the produced waters was increased. These are bacterial strains of a heterotrophic nature which can use dissolved oxygen as an electron acceptor to carry out metabolic synthesis processes at the expense of the organic content of the produced water. Such an expedient minimised the time needed to reach steady-state conditions and the maintenance of constant salinity conditions prevented hostile conditions for the acclimatised bacterial strains.

The experimental test on the biological treatment was carried out in a suspended biomass reactor SBR with an aeration system used to provide the metabolic oxygen demand and at the same time to provide the turbulence necessary to keep the biomass in suspension. The main reactor features and operating conditions are described in table 3.

TABLE 3

SBR reactor.

| | |
|---|---|
| Reactor Type | Suspended biomass SBR |
| Reactor volume | 5 l |
| Air flow rate | 45 l/min |
| Pressure | 1.11 bar |
| Temperature | 20° C. |

During the first part of the experimental test, the native biomass was grown and selected. This part was divided into three different steps: a cultivation step, a selection step and finally an operation step under stationary conditions. The advantage of the cultivation step was to develop the native biomasses which were best suited to the conditions imposed. Such a step lasted 35 days and was operated in complete cell retention mode. In detail, the cultivation reactor was fed daily with a synthetic solution made with 15 ml of water containing sodium acetate (20 g), ammonium chloride (3 g) and potassium orthophosphate (1 g), which were added to the 5 L of produced water in the reactor. Such a synthetic solution was rich in carbon (in the form of acetate) to provide the biomass with the organic substrate needed to implement the metabolic synthesis processes. The synthetic feed was also increased to the target concentration of 20 g/l by adding sodium chloride. During this step, as it was preparatory to achieving optimal process conditions, the concentrations of total suspended solids (TSS) were monitored and light microscopy analyses were carried out as indicators of bacterial growth. These analyses revealed the formation of biological sludge flocs.

In the second step, the selection step, the bulk present in the cultivation reactor was moved to the SBR reactor, brought to a volume of 5 l with the addition of produced water at a salinity of 20 g/l and fed daily in batch mode. In detail, the daily process cycle comprised a feeding step, in which 1 l of produced water was added to each SBR, a reaction step and a static sedimentation step in preparation for the discharge of 1 l of waste water from each reactor. The daily volumetric exchange rate for the reactor was therefore 20%. The bacterial strains which were able to make the best use of the organic content of the produced waters implemented faster growth processes and consequently grew more with respect to other strains present. This increased growth resulted in a faster formation of sludge flocs which, being able to settle, were retained inside the reactor. The strains which were instead unable to utilise the available substrate were washed down with the waste water. In order to avoid limitations to the biological process, the fed produced waters were previously enriched in nitrogen and phosphorus until a concentration of 1 mg $NH_4Cl\cdot l^{-1}$ and 1 mg $K_2HPO_4\cdot l^{-1}$ was reached.

The selection step lasted a total of 43 days and was terminated when the suspended solid concentration values reached were sufficient to operate under steady-state process conditions. Specifically, the SST concentrations in the bulk were 4.71 $gSST\cdot l^{-1}$.

The third step, that of the stationary conditions, was carried out under the same operating conditions as the selection step. Long-term process results assessed in terms of removal efficiency of the carbon content of the produced water measured as Total Organic Carbon (TOC) were observed. Monitoring was also carried out in batch reactors to assess the oxygen consumption due to metabolic activities.

The time needed to reach steady-state was identified as 40 days of operation, after which analyses were carried out to assess process performance.

Starting from this step, it was possible to observe the process performance, summarised in table 4.

TABLE 4

Main results in terms of total organic carbon removal.

| Full day | Input TOC | SBR output TOC | Removal efficiency |
|---|---|---|---|
| 1 | 150 mg/l | 29 mg/l | 81% |
| 11 | 150 mg/l | 22.5 mg/l | 85% |
| 50 | 150 mg/l | 34 mg/l | 77% |
| 55 | 150 mg/l | 27 mg/l | 82% |
| 61 | 200 mg/l | 21 mg/l | 90% |
| 70 | 200 mg/l | 19 mg/l | 91% |
| 82 | 200 mg/l | 26 mg/l | 87% |
| 89 | 175 mg/l | 20 mg/l | 89% |
| 92 | 175 mg/l | 19.5 mg/l | 89% |

In conclusion, the SBR system was able to satisfactorily remove the organic matter present, with removal efficiencies close to 90%. Such values, in addition to certifying the good biological treatability of the produced waters, are indicators of the robustness of the process. The system also offers considerable scope for improvement in terms of the treatable flow rate.

Example 3 Reverse Osmosis Process

In order to evaluate the performance of the reverse osmosis unit, a special mathematical model of the process was developed. This unit allows the recovery of water from the treated waste water and at the same time allows the concentration of any salts to be recovered. In fact, there will be two streams exiting the reverse osmosis unit. The diluted stream will be called 'permeate', while the stream in which the salts are concentrated will be called 'retentate'.

Varying the operating conditions of this unit results in different concentrations and flow rates of permeate and retentate. Simulations carried out for commercial modules (Dupoint BW30-400 and SW30XHR-440) on an industrial scale produce the results shown in table 5. It should be noted that the retentate concentration is usefully high to allow a concentration of the salts to be recovered in the relative unit.

TABLE 5 results of the reverse osmosis model simulations

| Current | TDS | Flow rate | Pressure |
|---|---|---|---|
| Entry | 24.2 g/l | 12 $m^3/h$ | 72 bar |
| Permeate | 0.4 g/l | 8 $m^3/h$ | |
| Retentate | 71.8 g/l | 4 $m^3/h$ | |

The developed model was validated with the most common design software available (e.g., Wave software).

The invention claimed is:

1. A process for the treatment of waste waters, or saline wastewater, with TDS≥20 g/l, and containing inorganic substances greater than or equal to 0.010 μm and organic substances in form of heavy pollutants, the process includes the following steps:

a. separating said saline wastewater or waste waters from suspended solids and heavy pollutants by physical separation, forming a saline stream free of suspended solids and heavy pollutants;

b. subjecting said saline stream to reverse electro-dialysis, using a reservoir solution with a salinity TDS not higher than 20 g/l to reduce the saline concentration and forming a diluate and a diluted stream with TDS not higher than 20 g/l, wherein the reservoir solution has a TDS≥0.5 g/l; and c. biologically treating the diluted stream obtained in (b) forming biological sludge, or excess sludge, and clarified water wherein the diluted stream in (b) is treated in a biological reactor.

2. The process according to claim 1, wherein the waste waters have TDS≥25 g/l.

3. The process according to claim 2, wherein the waste waters have TDS≥50 g/l.

4. The process according to claim 1, wherein the reverse electro-dialysis is carried out in short circuit mode or assisted mode.

5. The process according to claim 1, wherein the clarified water coming out from step (c) is separated from the biomass entrained in a second step of physical separation, forming a purified stream.

6. The process according to claim 1, wherein the diluate obtained after the reverse electro-dialysis is mixed with clarified water obtained after biological treatment, and the stream thus formed is sent to reverse osmosis, forming a retentate and a permeate with TDS not higher than 20 g/l.

7. The process according to claim 1, wherein the diluate obtained after reverse electro-dialysis is mixed with a purified stream obtained after a second physical separation downstream of the biological treatment, and sent to reverse osmosis, forming a retentate and a permeate with TDS not higher than 20 g/l.

8. The process according to claim 1, wherein the clarified water is directly sent to reverse osmosis, to form a retentate and a permeate with TDS not higher than 20 g/l.

9. The process according to claim 5, wherein the purified stream is directly sent to reverse osmosis, to form a retentate and a permeate with TDS not higher than 20 g/l.

10. The process according to claim 1, wherein the diluate is directly sent to reverse osmosis, to form a retentate and a permeate with TDS not higher than 20 g/l.

11. The process according to claim 1, wherein the clarified water is directly sent to a first reverse osmosis module, and the diluate is directly sent to a second reverse osmosis module, each one forming a retentate and a permeate with TDS not higher than 20 g/l.

12. The process according to claim 5, wherein the purified stream is directly sent to a first reverse osmosis module, and the diluate is directly sent to a second reverse osmosis module, each one forming a retentate and a permeate with TDS not higher than 20 g/l.

13. The process according to claim 6, wherein the permeate has a TDS not higher than 10 g/l.

14. The process according to claim 13, wherein the permeate has a TDS not higher than 5 g/l.

15. The process according to claim 1, which further comprises a step of recovery of salts from a retentate stream produced by reverse osmosis, wherein the clarified water coming out from step (c) is separated from the biomass entrained in a second step of physical separation, forming a purified stream, wherein the purified stream is directly sent to a first reverse osmosis module, and the diluate is directly sent to a second reverse osmosis module, each one forming a retentate and a permeate with TDS not higher than 20 g/l.

16. The process according to claim 15, further including a step of electro-dialysis with bipolar membranes for selective recovery of acids and bases from the retentate obtained by reverse osmosis, wherein the clarified water coming out from step (c) is separated from the biomass entrained in a second step of physical separation, forming a purified stream, wherein the purified stream is directly sent to a first reverse osmosis module, and the diluate is directly sent to a second reverse osmosis module, each one forming a retentate and a permeate with TDS not higher than 20 g/l.

17. The process according to claim 1, wherein the physical separation is carried out by filtration, ultrafiltration, or microfiltration.

18. The process according to claim 1, wherein the diluted stream in (b) is treated in a biological reactor.

19. The process according to claim 18, wherein the biological reactor is selected from the group consisting of: Sequencing Batch Reactor (SBR), Membrane Biological Reactor (MBR), Moving Bed Biofilm Reactor (MBBR), and Hybrid Moving Bed Biofilm Reactor (HMBBR).

20. The process according to claim 15, wherein the salt recovery step is an extraction.

21. The process according to claim 20, wherein the extraction is a crystallization and/or reactive crystallization.

22. The process according to claim 21, wherein the recovered salts or elements are selected from the group consisting of: lithium, cadmium, cobalt, iron, copper, manganese, bromine, fluorine, barium, iodine, gold, aluminum, tin, selenium, magnesium, gallium, strontium, cesium, phosphorus, beryllium, scandium, antimony, bismuth, indium, vanadium, tantalum, platinum, tungsten, silver, nickel, zinc, calcium, potassium, boron, germanium, rubidium, and titanium.

23. The process according to claim 1, wherein the reverse electro-dialysis step, both in the "short circuit (sc-RED)" and "assisted (A-RED)" mode, is carried out at a temperature from 2° C. to 60° C.

24. The process according to claim 6, wherein the reverse osmosis step is carried out at a temperature from 2° C. to 60° C.

25. The process according to claim 1, wherein the reverse electro-dialysis step is effected in the "short circuit (sc-RED)" or in "assisted (A-RED)" mode and it is carried out at a pressure higher than or equal to 1 atm.

26. The process according to claim 6, wherein the reverse osmosis step is carried out at a pressure higher than 1 atm.

* * * * *